Patented Nov. 10, 1931

1,831,101

UNITED STATES PATENT OFFICE

HENRY DREYFUS, OF LONDON, ENGLAND

TREATMENT OF MATERIALS CONSISTING SUBSTANTIALLY OF CELLULOSE AND THE PRODUCTION OF CELLULOSE ESTERS THEREFROM

No Drawing. Application filed October 31, 1925, Serial No. 66,103, and in Great Britain October 6, 1925.

This invention relates to the treatment of materials consisting substantially of cellulose for the purpose of rendering them more reactive for esterfication and especially acetylation and also to the production of cellulose acetates or other cellulose esters from said treated materials.

In French Patent No. 565,654 and U. S. Patent 1,708,787 the applicant has described inter alia how cellulosic materials may be pretreated with organic acids, such as acetic acid or other fatty acids, at ordinary or raised temperatures or with cooling, before subjecting them to acetylation or other esterification, while in U. S. Patent 1,711,110 and British Patent 249,173 the applicant has further described how such pretreatment with organic acids may be preceded, particularly in the case of cellulosic materials other than cotton such as wood pulps, by a treatment with alkaline substances to render the materials more reactive to acetylation or other esterification.

According to the present invention I treat cellulosic materials, for the purpose of making them more reactive for acetylation or other esterification, with vapors or organic acids either in the cold or with heating, the treatment being preferably performed by passing a stream of air or other inert gases laden with the organic acid vapor through or over the cellulosic materials. For instance a stream of air or other gas having a conveying effect may be passed first through dilute or more or less concentrated solution of acetic or other organic acid and then passed over or through the cellulosic materials which may optionally be subjected to stirring or agitation, for instance in revolving drums and the like. I do not of course limit myself to the method of making the mixture of organic acid vapor and air or other inert gas. Further, instead of passing a stream of organic acid vapor laden air, I may simply pass the organic acid vapors alone through the cellulosic material as for instance by drawing the said vapors over or through the cellulosic materials by suction or vacuum.

As before mentioned, the process may be performed either in the cold or with heating, the effect being the same in either case— namely, the cellulosic materials become very much more reactive for acetylation or other esterification purposes.

After subjecting the cellulosic materials to the process above described, they are preferably subjected to the action of a stream of air, or other indifferent gas or to suction or the like to remove partially or completely any organic acid or acids retained by the cellulosic materials.

As cellulosic materials I employ especially cotton cellulose (mercerized or non-mercerized) or wood pulp, the latter having been preferably first submitted to an alkali treatment such as the alkali treatment indicated in my previous British Patent 249,173 and my U. S. Patent 1,711,110. I may however employ other cellulosic materials or cellulose conversion products.

It is understood that all such cellulosic materials and conversion products are hereinafter in the claims included in the term materials consisting substantially of cellulose.

The following example is given by way of illustration it being understood that it is in no way limitative.

A mixture of air and acetic acid vapor or formic acid vapor, formed for example by passing air through concentrated, or about 40–100% and preferably 70–100%, acetic acid or formic acid, is passed through 100 parts of mercerized or unmercerized cotton in a revolving drum or the like. The treatment is preferably performed at ordinary temperature, though higher temperatures, as for instance from ordinary temperatures up to about 80 or 100° C., may be employed. The treatment may be carried out for 1 to 10 hours or more.

Instead of using cotton, I may employ wood pulp, preferably wood pulp which has been previously submitted to alkali treatment (especially the alkali treatment of my previous British Patent 249,173 and my U. S. Patent 1,711,110), or other cellulosic materials or cellulose conversion products. Further, instead of employing a mixture of air and organic acid vapor, I may employ acetic or formic acid vapor alone, for instance by drawing the said vapor over or through the cellulosic material under suction or vacuum.

The product obtained is highly active for acetylation purposes.

Further, according to the present invention I may subject the cellulosic materials to the action of organic acid vapors by soaking them in more or less concentrated or dilute organic acids, such as 50 to 100% formic or acetic acids, or mixtures thereof, the material being then hydro extracted (or less preferably pressed) and then passing air or like indifferent gas through the material either by blowing or by suction (preferably after opening up the cellulosic materials), thus vaporizing the acid or acids and obtaining the necessary treatment with vapors and ultimately removing the organic acid or acids partially or entirely.

By the present invention the treatment with organic acid is substantially simplified and reduced from a manipulative and economical point of view, quite apart from other advantages. Further, products pretreated with formic acid and from which the formic acid has not been previously removed, cannot be used directly for acetylation except where pretreatment was effected by acetic acid containing small quantities of formic acid, as formic acid reacts with acetic anhydride.

As before mentioned the present invention also includes the production of cellulose acetate or other cellulose esters from the cellulosic materials pretreated in the manner hereinbefore described.

For the production of cellulose acetate or other cellulose esters I subject the cellulosic materials, pretreated with organic acid or acids in accordance with the present invention, to any known or suitable process of acetylation or other esterification. Preferably, however, I employ processes of the character referred to in my previous British Patents 6463/1915, 14101/1915, 100009, 101555 or my U. S. Patents Nos. 1,280,974, 1,280,975, 1,278,885, and especially the process described in my prior British Patent 207562 or my U. S. Patent 1,708,787. The acetylation or other esterification may be performed in a manner to yield cellulose acetate or cellulose esters in solution or it may be performed in presence of diluents such as benzol which enable the process to be executed in suspension.

What I claim and desire to secure by Letters Patent is:—

1. A process for the treatment of materials consisting substantially of cellulose which comprises treating said material with a gas comprising vapors of a lower fatty acid and air, said fatty acid being the sole active constituent of the gas.

2. A process for the treatment of materials consisting substantially of cellulose which comprises treating said material with a gas comprising vapors of acetic acid and air, said fatty acid being the sole active constituent of the gas.

3. A process for the treatment of materials consisting substantially of cellulose which comprises treating said material with a gas comprising vapors of formic acid and air, said formic acid being the sole active constituent of the gas.

4. A process for the treatment of materials consisting substantially of cellulose which comprises treating said material with a gas comprising vapors of a lower fatty acid and an inert gas by first treating the material with a liquid comprising the lower fatty acid and then passing the inert gas through the material.

5. A process for the treatment of materials consisting substantially of cellulose which comprises treating said material with a gas comprising vapors of acetic acid and an inert gas by first treating the material with a liquid comprising acetic acid and then passing the inert gas through the material.

6. A process for the treatment of materials consisting substantially of cellulose which comprises treating said material with a gas comprising vapors of formic acid and an inert gas by first treating the material with a liquid comprising formic acid and then passing the inert gas through the material.

7. A process for the treatment of materials consisting substantially of cellulose which comprises treating said material with a gas comprising vapors of a lower fatty acid and air by first treating the material with a liquid comprising the lower fatty acid and then passing air through the material.

8. A process for the treatment of materials consisting substantially of cellulose which comprises treating said material with a gas comprising vapors of acetic acid and air by first treating the material with a liquid comprising the acetic acid and then passing air through the material.

9. A process for the treatment of materials consisting substantially of cellulose which comprises treating said material with a gas comprising vapors of a lower fatty acid and subsequently removing at least a part of the lower fatty acid from said treated material.

10. A process for the treatment of materials consisting substantially of cellulose which comprises treating said material with comprising vapors of a lower fatty acid and subsequently removing at least a part of the acetic acid from said treated material.

11. A process for the treatment of materials consisting substantially of cellulose to form cellulose esters which comprises treating said material with a gas comprising vapors of a lower fatty acid, subsequently removing at least a part of the lower fatty acid from said treated material, and then subjecting the thus treated material to esterification.

12. A process for the treatment of materials consisting substantially of cellulose to form cellulose esters which comprises treating said material with a gas comprising vapors of formic acid, subsequently removing at least a part of the formic acid from said treated material and then subjecting the thus treated material to esterification.

13. A process for the treatment of materials consisting substantially of cellulose to form cellulose acetate which comprises treating said material with a gas comprising vapors of a lower fatty acid, subsequently removing at least a part of the lower fatty acid from said treated material, and then subjecting the thus treated material to acetylation.

14. A process for the treatment of materials consisting substantially of cellulose which comprises treating said material with a gas comprising vapors of a lower fatty acid, said lower fatty acid being the sole active constituent of said gas.

15. A process for the treatment of materials consisting substantially of cellulose which comprises treating said material with a gas comprising vapors of acetic acid, said acetic acid being the sole active constituent of said gas.

16. A process for the treatment of materials consisting substantially of cellulose which comprises treating said material with a gas comprising vapors of formic acid, said formic acid being the sole active constituent.

17. A process for the treatment of materials consisting substantially of cellulose to form cellulose esters which comprises treating said material with a gas comprising vapors of a lower fatty acid, said fatty acid being the sole active constituent of said gas, and then subjecting the thus treated material to esterification.

18. A process for the treatment of materials consisting substantially of cellulose to form cellulose esters which comprise treating said material with a gas comprising vapors of formic acid, said formic acid being the sole active constituent of said gas, and then subjecting the thus treated material to esterification.

19. A process for the treatment of materials consisting substantially of cellulose to form cellulose acetate which comprises treating said material with a gas comprising vapors of a lower fatty acid, said lower fatty acid being the sole active constituent of said gas, and then subjecting the thus treated material to acetylation.

In testimony whereof I have hereunto subscribed my name.

HENRY DREYFUS.

CERTIFICATE OF CORRECTION.

Patent No. 1,831,101.                                Granted November 10, 1931, to

HENRY DREYFUS.

It is hereby certified that error appears in the printed specification of the above numbered patent requiring correction as follows: Page 2, line 120, claim 10, after the word "with" insert a gas, and line 121, same claim, for the words "a lower fatty" read acetic; and that the said Letters Patent should be read with these corrections therein that the same may conform to the record of the case in the Patent Office.

Signed and sealed this 22nd day of December, A. D. 1931.

(Seal)

M. J. Moore,
Acting Commissioner of Patents.